(12) United States Patent
Orten et al.

(10) Patent No.: US 9,277,586 B2
(45) Date of Patent: Mar. 1, 2016

(54) METHOD FOR REASSIGNING THE ROLE OF A WIRELESS NODE IN A WIRELESS NETWORK

(71) Applicant: ABB Research Ltd., Zurich (CH)

(72) Inventors: Pal Orten, Asker (NO); Frank Reichenbach, Slependen (NO)

(73) Assignee: ABB Research Ltd., Zurich (CH)

( * ) Notice: Subject to any disclaimer, the term of this patent is extended or adjusted under 35 U.S.C. 154(b) by 26 days.

(21) Appl. No.: 13/786,580

(22) Filed: Mar. 6, 2013

(65) Prior Publication Data

US 2013/0182558 A1 Jul. 18, 2013

Related U.S. Application Data

(63) Continuation of application No. PCT/EP2011/064909, filed on Aug. 30, 2011.

(30) Foreign Application Priority Data

Sep. 6, 2010 (EP) .................................... 10175481

(51) Int. Cl.
*H04W 84/18* (2009.01)
*H04W 84/20* (2009.01)

(52) U.S. Cl.
CPC .............. *H04W 84/18* (2013.01); *H04W 84/20* (2013.01); *Y02B 60/50* (2013.01)

(58) Field of Classification Search
CPC . H04W 84/18; H04W 84/20; H04W 28/0247; Y02B 60/50
USPC ........................................................ 370/216
See application file for complete search history.

(56) References Cited

U.S. PATENT DOCUMENTS 5,691,980 A * 11/1997 Welles, II .............. B61L 25/021
340/989
6,901,275 B1 * 5/2005 Aoyagi .......................... 455/574
2003/0195019 A1 * 10/2003 Litwin .......................... 455/574

(Continued)

FOREIGN PATENT DOCUMENTS

| EP | 2083590 A2 * | 7/2009 | ............ H04W 16/10 |
| EP | 2134041 A1 | 12/2009 | |
| WO | WO 2006052565 A2 * | 5/2006 | ............... H04Q 7/20 |
| WO | 2008141719 A1 | 11/2008 | |

OTHER PUBLICATIONS

Lin, Shizhuang et al., "ZigBee Based Wireless Sensor Networks and Its Applications in Industrial", Aug. 2007, IEEE, Proceedings of the IEEE International Conference on Automation and Logistics, Pages: all.*

(Continued)

*Primary Examiner* — Un C Cho
*Assistant Examiner* — Shah Rahman
(74) *Attorney, Agent, or Firm* — Whitmyer IP Group LLC (57) ABSTRACT

A method for maintaining network lifetime of a wireless network in wireless communication system, the network including a plurality of device nodes. Selected ones of the wireless nodes have assigned roles in the wireless network. To improve and maintain network lifetime the method includes determining a below threshold operating condition of a first sensor node assigned to a first role and re-assigning the first role to another second node in said network. In other aspects of the invention a method, system and a computer program for carrying out the method are described.

21 Claims, 4 Drawing Sheets

(56) References Cited

U.S. PATENT DOCUMENTS

| | | | |
|---|---|---|---|
| 2005/0033816 A1* | 2/2005 | Yamaguchi et al. | 709/208 |
| 2005/0059420 A1* | 3/2005 | Salokannel et al. | 455/522 |
| 2007/0153675 A1* | 7/2007 | Baglin | H04W 48/20 370/216 |
| 2008/0013502 A1* | 1/2008 | Clark | G08C 17/00 370/338 |
| 2008/0070614 A1* | 3/2008 | Ogushi | H04W 52/0216 455/522 |
| 2008/0137624 A1* | 6/2008 | Silverstrim et al. | 370/338 |
| 2008/0151761 A1* | 6/2008 | Theisen | H04W 24/08 370/241 |
| 2009/0111532 A1 | 4/2009 | Salokannel et al. | |
| 2009/0141653 A1* | 6/2009 | McNeill et al. | 370/254 |
| 2009/0224906 A1* | 9/2009 | Balgard | H04L 41/0809 340/539.1 |
| 2010/0008256 A1* | 1/2010 | Chebbo et al. | 370/254 |

OTHER PUBLICATIONS

Fernandes, Leonardo L. et al., "MVSINK: Incrementally Improving In-Network Aggregation", Oct. 2007, IEEE, Mobile Adhoc and Sensor Systems, 2007. MASS 2007, pages: all.*

European Search Report Application No. EP 10 17 5481 Completed: Jan. 27, 2011; Mailing Date: Feb. 14, 2011 10 pages.

International Preliminary Report on Patentability Application No. PCT/EP2011/064909 Completed: Jan. 16, 2013 26 pages.

International Search Report and Written Opinion of the International Searching Authority Application No. PCT/EP2011/064909 Completed: Nov. 7, 2011; Mailing Date: Nov. 28, 2011 16 pages.

Written Opinion of the International Preliminary Examining Authority Application No. PCT/EP2011/064909 Mailing Date: Aug. 1, 2012 5 pages.

* cited by examiner

METHOD FOR REASSIGNING THE ROLE OF A WIRELESS NODE IN A WIRELESS NETWORK

FIELD OF THE INVENTION

The present invention is concerned with a method for improving and maintaining network lifetime of a wireless communication network including a plurality of wireless device nodes. In particular the invention is concerned with a method for supervising a network that includes assigning roles in the wireless network in an energy-efficient way and may comprise assigning roles to improve network functionality; and with wireless devices arranged with hardware and software devices for carrying out the method. The method is particularly advantageous when used to maintain network lifetime for a wireless sensor network of an industrial control system or with a process control system.

BACKGROUND OF THE INVENTION

Industrial control systems, process control systems, distributed control systems and the like in process industries often comprise both hard wired data networks and wireless data networks. Process industries can include branches of industry such as pulp and paper, pharmaceuticals, food production, oil and gas extraction, production, processing and the like. Wireless sensor networks are used to communicate measurements and some control data between wireless field devices such as sensors and the industrial control system. Wireless sensors are most often battery powered.

Service life for a battery-powered wireless sensor depends on power use. Service life for a wireless sensor network also depends therefore on power use by individual wireless sensors. The radio receiver/transmitter of a wireless sensor typically consumes most power while sending a transmission, and power while listening for transmissions, and almost no power during an inactive state. Conventionally wireless sensors in a WSN are configured to use little or no energy during inactive periods, also called a sleep state, conserving energy for a limited number of periods for listening for signals and/or for transmitting a signal.

An industrial installation may contain hundreds or thousands of tiny electronic devices, able to sense the environment, compute simple tasks, communicate with each other, and form larger wireless mesh sensor networks (WSN). Information gathered by the sensors (e.g. temperature, humidity etc.) is transmitted in a multi hop fashion via direct neighbors (mesh network) to a control system. With methods such as self configuration and self organization the network reacts to node failures and disconnected nodes due to exhausted battery energy.

Due to the required small size of nodes as well as the strongly constrained battery capacity one major requirement in WSNs is to distribute the networks services in an efficient manner. The long-term strategy of that is to extend the lifetime of the network to a maximum. In more detail the overall sensor network services need to be kept up as long as possible with the same high reliability and expected determinism.

WSNs must provide a variety of discrete services with different resource requirements. Moreover different services have also a different consumption of battery energy, meaning there are very high energy consuming tasks and less energy consuming tasks. Also the position of the nodes has influence on this energy consumption, whereas a node in the middle of a network, and many neighbours, with an aggregation functionality will certainly consume more power than a node with an aggregation role with only few neighbours at the border. Some functionality needs only be performed by a subset of nodes at any specific time. Such functionality can be for instance aggregation (aggregator service needed), cluster routing (gateway service needed), localization (reference nodes with known position needed). In the end the number of different roles needed can vary depending on the application. We define such subsets of node functionalities as roles, and the nodes performing the roles will be called role nodes.

The energy demand of a role varies significantly for different roles. Typically, the role nodes consume incomparably more energy than the other sensor nodes due to more complex calculations and higher communication efforts needed. The role nodes must provide high availability and cannot sleep as long and as frequently as the other nodes. This makes them more vulnerable to battery exhaustion. A rapid exhaustion of role nodes quickly limits or blocks the operation and functionality of the whole network.

A patent application US20090111532 entitled Method and system for power-based control of an ad hoc wireless communications network, and assigned to Nokia Corporation, describes a method, system and program code to implement a wireless network having a plurality of devices in which one of the devices coordinates wireless communications between the devices. The description describes node condition in terms of battery level and aim to coordinate devices to optimize for communication across a network. Application US20050059420, same title, same assignee, also describes coordination in a network relative to node power level.

A patent U.S. Pat. No. 6,901,275, entitled Communication system, and communication device and communication method for use in the communication system, assigned to Toshiba Corp., describes a system aimed at preventing (the network) from concentrating communication on one terminal, thereby avoiding an increase in power consumption and thereby prolonging the network configuration time when forming a network by a plurality of devices. However, the consideration of network life is limited to a parameter for node battery power and the network structure is limited to the situation of a single Master with many slaves.

WO2008/141719, entitled Energy-driven cluster aggregation point re-election in a wireless sensor network, assigned to University College Dublin, describes a sensor network comprising a plurality of nodes arranged to communicate wirelessly with one another, at least some of the nodes being arranged to operate as an aggregation point for the network, in which the aggregation point communicates data between other nodes of the network and externally of the network. However only one function or role, that of data aggregation, is considered here and the operative extension of network lifetime is limited to being based on node battery power alone.

Patent application US20090141653, entitled Enhancement of node connectivity in a wireless communications network with changing topology via adaptive role changing, assigned to BAE Systems Information, describes a process and system for enhancing connectivity among nodes of a wireless communications network by adapting to changes in the network topology. Nodes of the network are configured to operate according to either (i) an ad hoc protocol wherein a given node assumes a role of a mesh node capable of connecting with other like-configured nodes, or (ii) a point-to-multipoint protocol wherein the given node assumes a role of either a base station, or a subscriber station being served by another node which is assuming the role of a base station. A determination is made as to whether each node should operate according to the ad hoc protocol or the point-to-multipoint protocol, in order to maintain an optimum state of connectivity among all nodes of the network. The roles described are only mesh node, base station etc., so they are limited to network properties.

U.S. 2005/033816 A1 discloses a terminal device and method for use in a media access communication system. Terminal devices store statistical information related to interference from an external communication system, and notify the stored statistical information to a master station. The master station is arranged to determine if one of the terminal devices is a candidate station for a master station capability handover destination based collected statistical information.

U.S. 2005/059420 A1 discloses a method and system for implementing a wireless network having a plurality of devices in which one of the devices coordinates wireless communication between the devices. The method and system evaluates device parameters of one or more of the plurality of devices, and determines a coordinator from the plurality of devices based on at least the available power source characteristics such as an available power source capacity, for one or more of the plurality of devices, wherein the coordinator is adapted to coordinate wireless communication between the devices in the wireless network.

EP 2 134 041 A1 discloses a wireless sensor network having a plurality of mobile sensor nodes. In the wireless sensor network a sink is provided and re-positioned as required by assigning the role of sink to one of the mobile sensors at a time.

However, the lifetime of a wireless network may also be affected by factors other than a power level of a node battery. When one of certain other operating conditions of one or more wireless nodes falls below an operating threshold, forming what is described here as a bad condition such as; bit error rate (BER), low memory availability, imprecise position, reduced available bandwidth, incomplete or unsuccessfully finished self test, un-validated node (in terms of security), bad location, high EMI noise in the environment, old software revision, bad connectivity (too few neighbouring nodes) bad or deteriorated antenna direction, then the maintenance of the wireless network may be compromised.

There are generally many different wireless protocols in use in industry. This includes proprietary protocols, open protocols and networks with more than one type of protocol operating in the same broadcast/reception area. Such protocols include for example Bluetooth and ZigBee. Two other examples of a wireless standard in use in industry are called ISA100 also including version ISA 100.11a, for wireless sensing in industrial automation applications, and WirelessHART. WirelessHART is a standard that was developed to be compatible with older HART standards for communication between industrial devices.

SUMMARY OF THE INVENTION

The aim of the present invention is to remedy one or more of the above mentioned problems. This and other aims are obtained by a method maintaining network lifetime of a wireless sensor network.

In a first aspect of the invention a method for maintaining network lifetime of a wireless network such as a wireless sensor network (WSN) of an industrial control or monitoring system is disclosed, said wireless network comprising a plurality of device nodes.

According to a first aspect of the invention, a method is described for maintaining network lifetime of a wireless network of a wireless communication system, said network comprising a plurality of device nodes wherein selected nodes have assigned roles in said network, wherein the method comprises determining a below threshold operating condition of a first node assigned to a role and re-assigning the role to another, second node in said network.

According to an embodiment of the invention, a method is described for maintaining network lifetime of a wireless network of a wireless communication system, said network comprising a plurality of device nodes wherein selected nodes have assigned roles in said network, and where the method comprises determining a below threshold operating condition of a first node assigned to a role and re-assigning the role to another, second node in said network wherein the method further comprises the step of determining that the second node is a candidate node which does not have a below-threshold operating condition, the second node being a candidate node from a list of candidate nodes.

According to another embodiment of the invention, a method is described for maintaining network lifetime of a wireless network of a wireless communication system, where the method comprises determining a below threshold operating condition of a first node assigned to a role and re-assigning the role to another, second node in said network wherein the method further comprises determining that the second Node does not have a below threshold operating condition and by step that the Node accepts the role.

According to another embodiment of the invention, a method is described for maintaining network lifetime of a wireless network of a wireless communication system, where the method comprises determining a below threshold operating condition of a first node assigned to a role and re-assigning the role to another, second node in said network wherein the method further comprises determining that the second Node has a below-threshold operating condition and by the second Node passing the role to another candidate on the candidate list.

According to yet another embodiment of the invention, a method is described for maintaining network lifetime of a wireless network of a wireless communication system, where the method comprises determining a below threshold operating condition of a first node assigned to a role and re-assigning the role to another, second node in said network wherein the method further comprises determining that second Node has a below threshold operating condition and by removing the second Node from the candidate list.

According to another embodiment of the invention, a method is described for maintaining network lifetime of a wireless network of a wireless communication system, where the method comprises determining a below threshold operating condition of a first node assigned to a role and re-assigning the role to another, second node in said network wherein by the first sensor node determining or detecting a below threshold operating condition of itself and requesting re-assignment with a release request to a Network Coordinator of said network.

According to another, further embodiment of the invention, a method is described for maintaining network lifetime of a wireless network of a wireless communication system, where the method comprises determining a below threshold operating condition of a first node assigned to a role and re-assigning the role to another, second node in said network wherein the method further comprises steps of the network Coordinator searching the list of candidate nodes to find a node that does not have a below threshold operating, or a node having better operating conditions, according to at least one predetermined criteria.

According to another embodiment of the invention, a method is described for maintaining network lifetime of a wireless network of a wireless communication system, where the method comprises determining a below threshold operating condition of a first node assigned to a role and re-assigning the role to another, second node in said network wherein the Network Coordinator, on finding a candidate that does not have a below threshold operating condition according to one or more optimisation criteria, sends a role re-assign command to the candidate node and sends a role release command to the first node.

According to another, further embodiment of the invention, a method is described for maintaining network lifetime of a wireless network of a wireless communication system, where the method comprises determining a below threshold operating condition of a first node assigned to a role and re-assigning the role to another, second node in said network wherein the method further comprises storing the candidate list of candidate nodes as a list or file in a memory storage unit of all nodes in the network, or else by storing the candidate list in the node running the Network Coordinator function only.

The invention provides a number of ways to maintain, improve and in some cases extend the lifetime of a wireless network such as a wireless sensor network. In particular the ways and method of assigning and re-assigning the roles that provide a network service in a wireless network has the advantages that:
   The new solution maintains the expected network functionality over the entire lifetime;
   With the proposed solution the network lifetime will be increased by up to a factor proportional to the ratio of number of nodes divided by the number of role nodes;
   The new solution exploits the network resources in a more efficient manner and thus increases the reliability of the network.

A wireless node can be the subject of a bad condition, in particular when an operating parameter or other operating condition of the device node falls below a threshold value. A bad condition is most often when available power, e.g. battery power, has fallen below a predetermined level, but may also or instead be due to a deterioration of another operating condition, such as bit error rate (BER), low memory availability, imprecise position, reduced available bandwidth, incomplete or unsuccessfully finished self test, un-validated node (in terms of security), bad location, high EMI noise in the environment, old software revision, bad connectivity (too few neighbouring nodes) bad or deteriorated antenna direction and so on. If or when a role node detects a bad condition it can release itself from the role by passing the role on to a candidate node. The list of candidate nodes contains initially the neighbor nodes. The candidate node shall take on the role unless it has a bad condition itself. In case it has a bad condition or when it is determined that an operating condition of the node has fallen below a predetermined threshold value it should:
i) pass the role on to one of its candidate nodes,
ii) remove this node from its own list of candidates,
iii) the node it received the role from should be the last node in the candidate list.

Returning the role to the node it was received from as described above must be allowed to avoid that the role is stuck in leaf nodes. However, with the procedure described above the role will not go in circles as candidates are removed from the candidate list (ii) once the role has been passed on (i).

Thus a wireless network such as a wireless sensor network using the inventive method is improved by:
   increasing the lifetime of the network, processing load spread on many nodes over time;
   increasing the intervals between maintenance;
   increasing robustness of the network, because the whole functionality will be kept up till the end;
   reducing vulnerability to single node failures as roles will be passed on;
   automatically carrying out role assignment leading to less manual configuration.

This is achieved by a method and scheme that avoids any communication overhead required by a more centralized approach.

Automatic re-assignment of roles between the wireless sensor devices enables the network to be maintained for longer periods without battery replacements. The advantages of reduced energy use are particularly great in industrial installations with hundreds or thousands of wireless sensors. Servicing wireless sensor devices normally means stopping parts of a plant for some weeks, implementing rigorous safety routines in hazardous areas and deploying skilled engineers and technicians to locate and service the various devices. Avoiding or reducing maintenance shutdowns greatly reduces shutdown or startup-induced problems and improves productivity.

Optionally the candidate list may be maintained on one central node, the Network Coordinator NC, instead of that each node maintains a candidate list. The advantage of this is that with a minimum of centralized function the maintenance and updating of candidate nodes is made more robust.

Wireless sensor networks may be connected permanently or temporarily to control systems for monitoring and control purposes and are widely used in a number of different industrial environments, such as for instance pulp and paper processes, oil and gas production processes and electrical power production processes. There is a continual and generally increasing requirement for information about plant equipment, current and historic process data, trends, etc to carry out supervision and control of control of processes, industrial plants and production facilities. This information is typically provided by the control system and usually in the form of one or more distributed control systems (DCS) and/or supervisory control and data acquisition (SCADA) systems. The control system relies in turn on a stable and timely flow of measurement data from sensors, actuators such as valves etc, temperature measurement, pressure measurements and so on.

In another aspect of the invention, a wireless device is disclosed which comprises a circuit and a memory storage device arranged with a computer or processor and suitable instructions to carry out a method of re-assigning a role from one node to another in a wireless network.

In another aspect of the invention, a wireless network system is disclosed which comprises a plurality of wireless devices arranged for use in a wireless network wherein each wireless device node is arranged with a circuit and a memory storage device arranged with suitable instructions to carry out a method of re-assigning a role from one node to another in the wireless network.

A computer program, and a computer program recorded on a computer-readable medium such as a computer program product, is disclosed in another aspect of the invention.

BRIEF DESCRIPTION OF THE DRAWINGS

A more complete understanding of the method and system of the present invention may be had by reference to the following detailed description when taken in conjunction with the accompanying drawings wherein.

DETAILED DESCRIPTION OF THE INVENTION

The present invention will now be described more fully hereinafter with reference to the accompanying drawings, in which certain embodiments of the invention are shown. Like numbers refer to like elements throughout the description.

Figure 1:
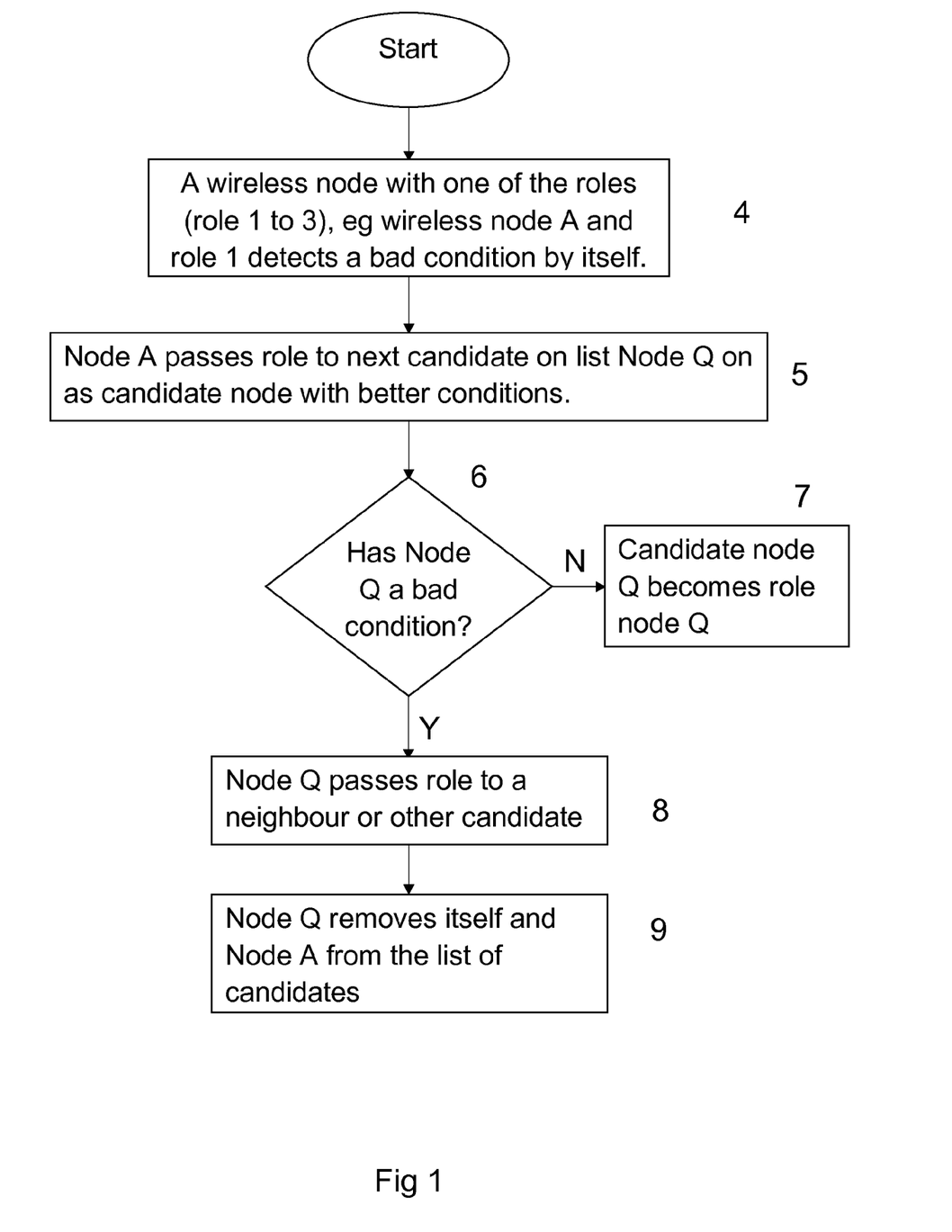
FIG. 1 shows a schematic flowchart for a method for assigning roles in a wireless network according to a first aspect of the invention.

FIG. 1 shows a flowchart summarising steps in a method for a plurality of device nodes in a wireless sensor network according to a first aspect of the invention. The figure shows a process that takes place in a wireless device node of a network such as in a wireless node A or Q which are shown schematically in FIG. 4. The following assumptions are made, that a) sensor nodes are able to detect various bad conditions (e.g. the sensor battery falls below a defined level or the sensor node wireless communication error rate exceeds a defined value); and b) sensor nodes can communicate directly or via neighbour hops.

Exemplary parameters that may be regarded in a particular or a general situation to be a bad condition are:
a) Low battery (or low level in an accumulator, condenser, capacitor)
b) Little bandwidth (possibly because many nodes are active in an area)
c) High bit error rate (BER)
d) Imprecise position
e) Incomplete or unsuccessfully finished self test (possibly due to a hardware error)
f) Unsecure or un-validated node (in terms of security, possibly not identified correctly)
g) Low memory availability
h) Old software revision
i) high EMI noise in the environment
j) bad connectivity (too few neighbouring nodes)
k) Bad or deteriorated antenna direction (if applicable)
l) Bad position in the field (maybe to near a border, but sometimes that could be an advantage as well)
m) Low power supply level, such as when powered by a local power source such as a fuel cell, solar cell; a wind or wave turbine, or power from a scavenging power source such as inductive power scavenging; power from a thermal-magnetic to electrical energy conversion unit or TME generator; power from a transducer converting kinetic motion or vibration to electrical charge/current; bio-battery with bacteria; thermal power.

When roles are assigned so as to avoid certain bad conditions, such as conditions i-l or m above then network communication is carried out in a more energy-efficient way. Thus in bad condition j nodes in that area of the network consume excess power by re-sending too many times, so that re-assigning the role to a node with enough neighbours improves the energy efficiency of that part of the network. In this way the network functionality is improved. This is in addition to simply re-assigning a role from one node with a bad condition such as low battery to the next node with an acceptable battery level.

Certain bad conditions, such as a parameter based on bit error rate BER, may be expressed in a way, such as 1/BER, so that a bad condition occurs when the absolute value expressed rises above a predetermined level. Thus the expression falls "below threshold operating condition" as used here covers the case when the operating condition deteriorates even if the absolute value of the parameter involved is determined to have risen above a predetermined value.

If or when a role node such as A, B or C detects a bad condition due to an operating condition or parameter falling below a threshold value it can release itself from the role by passing the role on to a candidate node. The re-assignment of roles takes place in a substantially random way. The list of candidate nodes (CL shown in FIG. 4, below) contains initially the nodes. The list of candidate nodes can be maintained by the Network Coordinator NC or maintained on every node and stored in a processor. In the case where the candidate list is maintained on every wireless node, it may be a list of the neighbouring nodes only to the wireless node; or it may be a list with one or more groups of nodes in the network; or it may be a list of all nodes in the network. The candidate node shall take on the role unless it has a bad condition itself. In the case where it has a bad condition already, or the case where it subsequently enters a bad condition, it should check and then act according to whether it has a bad condition (e.g. low battery or high error rate exceeding pre-set value) or not.

FIG. 1 shows a flowchart for carrying out first method according to the invention. In this exemplary description of an embodiment, the following steps in FIG. 1 are carried out:
4 A sensor Node A with a role 1 (1-3) detects a bad condition for itself;
5 Sensor Node A selects a (neighbour) candidate node Q as next node on a list of candidate nodes that should have better conditions;
6 Sensor Node Q receives a role assign request from Node A and checks to see if it has a bad condition;
if No, then
7 Node Q takes the role 1, and
if Yes, then
8 Node Q passes the role 1 to another candidate on the candidate list and
9 Node Q removes itself from the candidate list, and preferably also removes Node A.

Returning the role to the node it was received from as described above must be allowed so as to avoid that the role becomes stuck in a leaf node. However, with the procedure described above the role will not go in circles because unsuitable candidates are removed from the candidate list once the role has been passed on. This method has the advantage that it is an automatic way to re-assign roles, and a way that requires very minimal configuration during set-up of the network. Despite the simple nature, the method increases the lifetime of the network by spreading the network processing load over many nodes over time. It also increases the length of the maintenance intervals. It furthermore increases robustness of the network, because the whole functionality will be kept up to the point when the network stops functioning and provides a reduced vulnerability to single node failures because the roles are passed on.

Wireless nodes in a wireless sensor network are arranged with a sensor of some kind. The wireless node may be in the form of a wireless instrument or wireless transducer; it may also be in the form of a sensor to which a wireless adapter is connected. As described above sensors are used in industrial installations to monitor or sense temperatures, pressures and pass the parameter values to a control system. The sensing may be directly applied in an apparatus or a process. The sensing may also be applied in the environment of the apparatus or process and measure temperatures, vibration, detect gases or other parameters of interest in the surroundings of the apparatus or process of interest.

This simple and substantially random method achieves assignment of roles within a wireless network and, at the same time, avoids any communication overhead that would be required by a more centralized approach. There is, however, no coordination of the role node assignment and thus less assurance of optimal placement or optimal distribution. For more optimal distribution the conditions of different nodes need to be considered.

Figure 4:
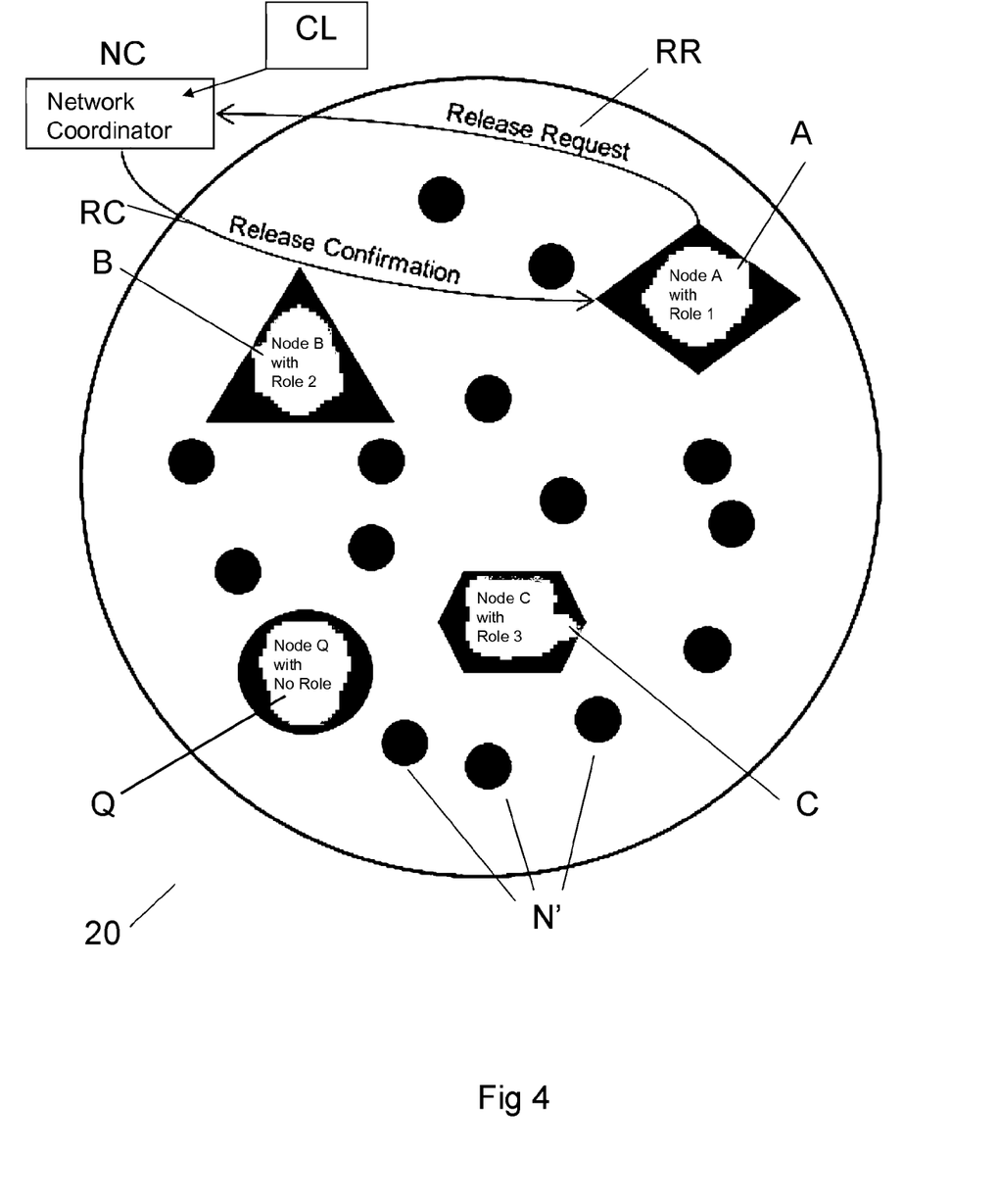
FIG. 4 shows a schematic block diagram of a simple wireless network in which a method according to the invention of FIG. 1 is applied.

Assignment or re-assignment of roles may also be carried out in part using a network coordinator. A network coordinator (NC) may know the conditions of the different nodes (which must be communicated to the NC), in order to find optimal distributions. An NC would then assign and release roles (also with associated communication). FIG. 4 is a schematic diagram that shows a wireless network 20 with a simple example of a network topology. The wireless network has a number of wireless nodes A, B, C each of which having a role (1, 2, 3) assigned to it. The diagram also shows a number of other wireless nodes Q, N' without assigned roles in the wireless network. According to another embodiment, a node with a role such as Node A with role 1, may re-assign the role to another node in the network in an optimized way. The following additional assumptions are made: a) this applies to networks with an entity such as a Network Coordinator (NC) or similar; the NC supervises the network, and b) the sensor nodes can communicate directly or via neighbour hops with the NC and vice versa.

In this embodiment a Network Coordinator NC application or function carries out a process to find a better candidate for the role. The Network Coordinator is a function or application that carries out supervision in the network. This function may be carried out by another node, by a Gateway, an Access Point or other device.

The invention may be applied to maintaining, improving and/or extending the life of a wireless network in which nodes have roles for many end uses, including wireless networks in the home, mobile wireless networks, and wireless networks in public spaces or in commercial buildings, or sites. The invention when practised with as an industrial WSN usually has a predictable pattern of communication with mainly deterministic transmission, with wireless sensors operating according to predetermined tasks and known processes and expected data collection/reporting. An industrial WSN may also experience 'hot spots' of data collection and sending activity in certain nodes, for example when an event such as a gas leak occurs, or a specific alarm is generated, when for example, an increased number of exception reports are generated in a certain area during a particular time interval. This may also happen in other applications or wireless networks in which wireless nodes are assigned roles. For example in a civil security application monitoring an area, or in a civil use such as monitoring an area of land for agricultural purposes, wherein wireless sensors are distributed over an area of land to collect e.g. weather phenomena or measurements related to conditions for growing crops etc. Similarly when the invention is applied to collect temperatures, pressures, vibration readings and so on in an area of land for military purposes, certain hot spots of activity may occur. Such changes in communication intensity and/or part of a network may be handled by assigning or re-assigning a role, such as a role for data aggregation, to improve or extend the life of a wireless network.

Figure 2:
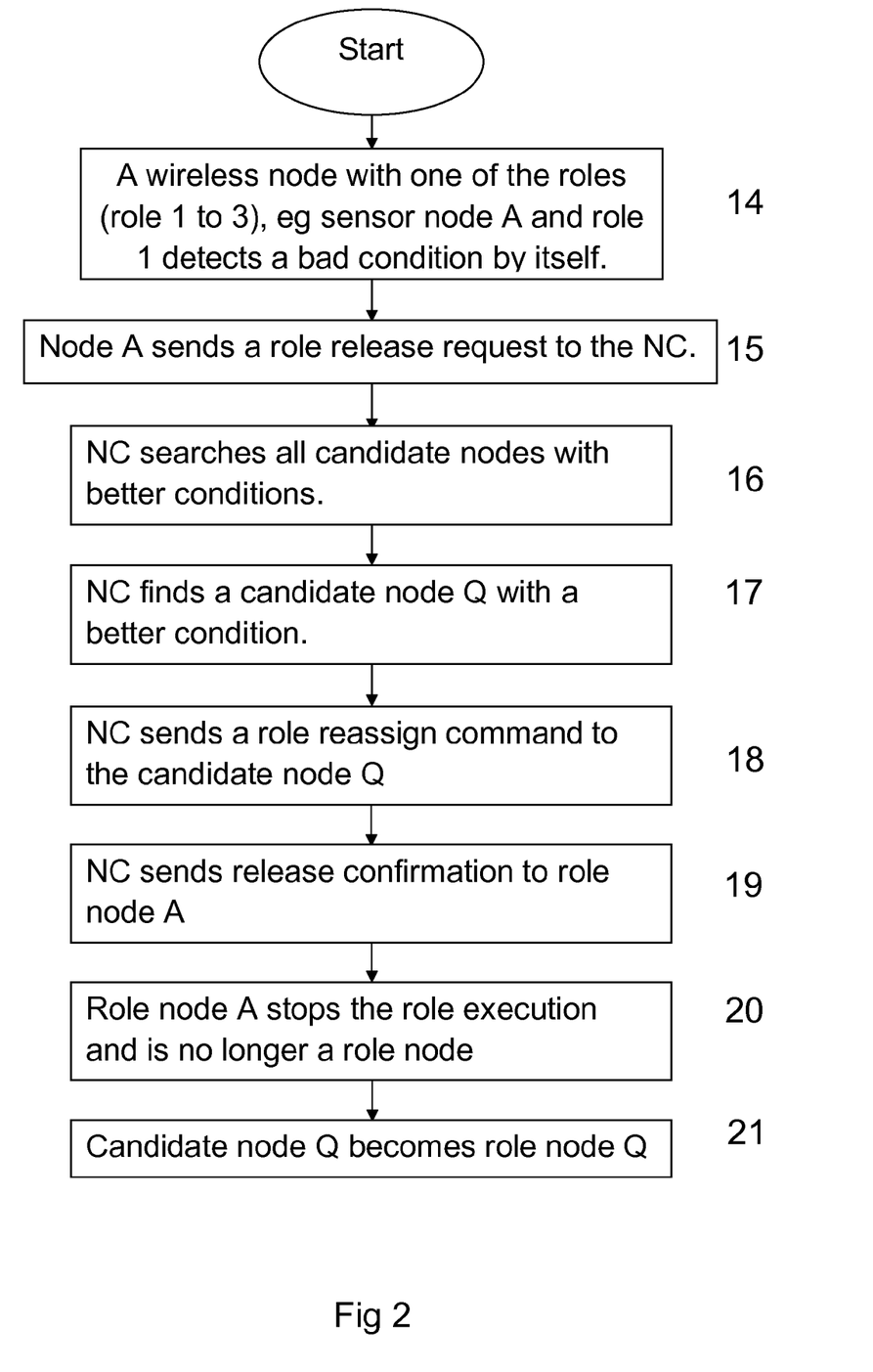
FIG. 2 shows a schematic flowchart for a method according to the invention of FIG. 1 and in particular wherein a network coordinator carries out a method step to perform the invention.

If a bad condition is detected for a role node, meaning that an operating condition or parameter of the device node has fallen below a predetermined threshold value, and when other sensor nodes in the network exist with better conditions, here called candidate nodes, the role will be re-assigned to a candidate node. The choice among all candidate nodes is determined by using an appropriate optimization criteria. Role reassignment can be distributed (initiated by node) or central (initiated by NC or equivalent). A distributed re-assignment of roles is described first. In an exemplary description of the embodiment, the following steps in FIG. 2 are carried out:

14. A sensor node with one of the roles (roles 1 to 3), e.g. sensor node A with role 1 (shown in FIG. 4), detects a bad condition by itself;
15. Node A sends a role release request RR to the Network Coordinator NC;
16. The NC searches all candidate nodes with better conditions by checking a candidate list (CL);
17. The NC finds a candidate node e.g. Node Q with a better condition;
18. The NC sends a role reassign command to the candidate Node Q;
19. The NC sends a role release confirmation RC to role Node A,
20. Role Node A stops the role 1 execution and is no longer a role node;
21. Candidate node Q becomes role Node Q with role 1.

In an optional development the process may include an additional acceptance (acknowledgement) message or messages to confirm acceptance of the Role, such as one or more extra step(s) between step 18 and 19 above, so that the change of roles is done in a more secure way. It may be preferable in some networks that the acceptance of a newly assigned Role is positively confirmed before the node currently having the Role is released. In another variant of the method, step 19 may optionally be carried out before step 18, with or without acceptance messages (acknowledgements).

One advantage of the above method is that re-assignment of roles is carried out by a centralised process but it is based on a distributed trigger mechanism. The re-assignment can be made based on predetermined criteria and optimised in some way for the network lifetime or for another wireless network aspect. As the criteria are held centrally, by the network coordinator, adaptation or upgrade of the criteria may be carried out centrally with minimum re-configuration for the wireless network as a whole and without any re-configuration of the wireless nodes.

Figure 3:
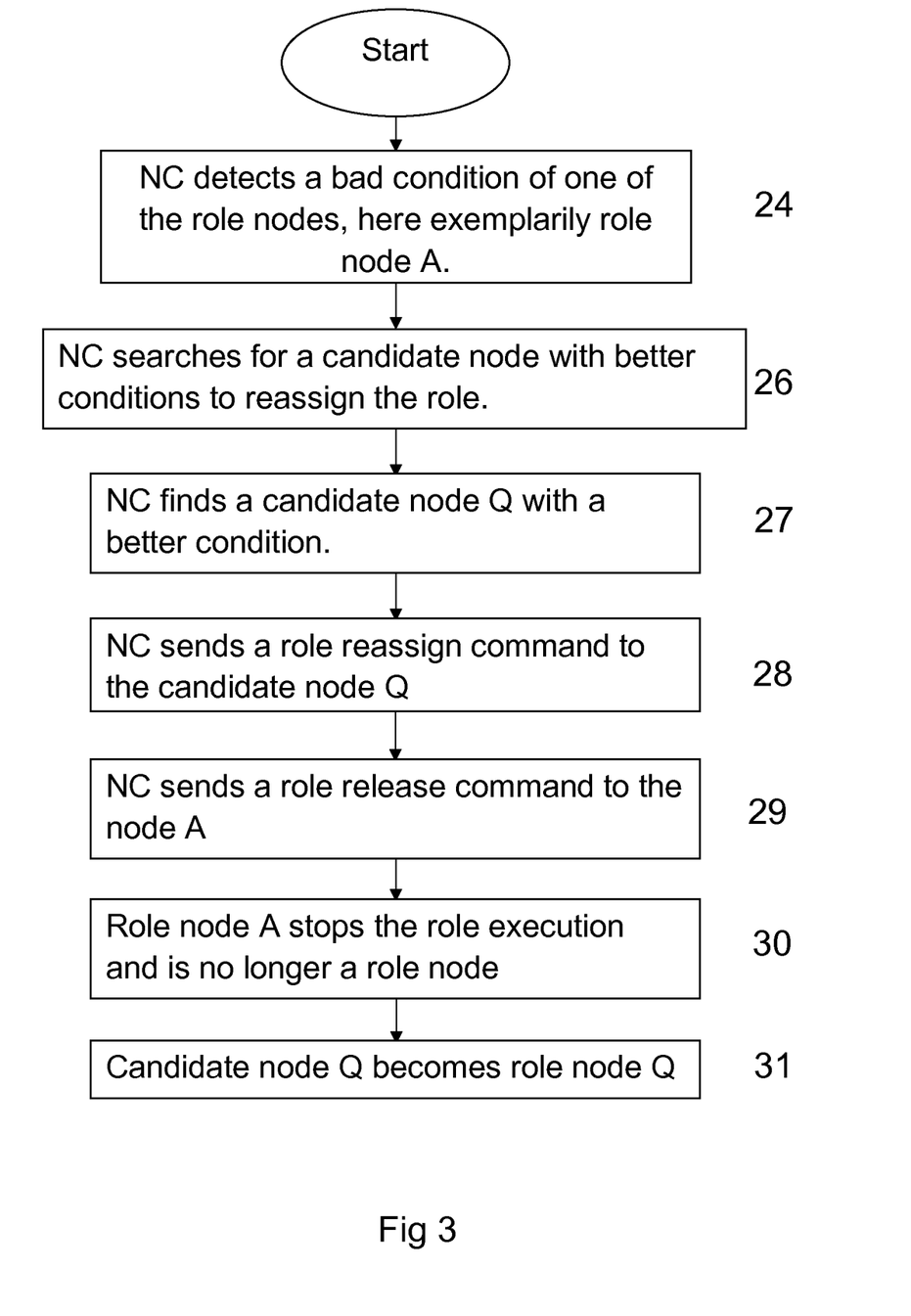
FIG. 3 also shows a schematic flowchart for a method according to the invention of FIG. 1 wherein a network coordinator performs further method steps for a method according to the invention of FIG. 1.

According to another embodiment a role such as role 1 with Node A may be re-assigned to another node in the network in another, further, optimized way in which the Network Coordinator initiates the re-assignment. In this method the Network Coordinator detects or determines that a node with a role, e.g. Node A with role 1, has a bad condition, or that Node A for another reason, shall not continue to carry out role 1. Role re-assignment can be distributed centrally, initiated by the NC or equivalent or a similar function.

According to an exemplary description of the embodiment, the following steps in FIG. 3 are carried out:

24. The NC detects or otherwise determines a bad condition of one of the role nodes, for example Node A with role 1;
26. The NC searches for a candidate node with better conditions to reassign the role to;
27. The NC finds a candidate Node Q with a better condition;
28. The NC sends a release command and/or release confirmation RC to role Node A, 29. The NC sends a re-assign command to candidate Node Q,
30. Role Node A stops the role execution and is no longer a role node;
31. Candidate Node Q becomes a role Node Q with role 1.

Similarly to the method described in relation to FIG. 2, an optional development of the process may include an additional acceptance (acknowledgement) message or messages to confirm acceptance of the Role, e.g. one or more extra step(s) between step 28 and 29 above, so that the change of roles is done in a more secure way.

An advantage with this method is that the entire re-assignment process is carried out centrally and no processing load is taken by the nodes. Thus energy demand on the sensor nodes, which being normally battery powered have only a finite amount of energy, is not significantly increased when using this method. Also the network coordinator function may be preferably carried out by a device, such as a Gateway, Access point or other device, having a substantially unlimited power supply, being grid powered or line powered. In addition, configuration of criteria for bad condition, or any other reason for re-assigning a role from a first node, may be carried out centrally so that a re-configuration or software update for all wireless nodes is in not required.

A wireless sensor network may also be connected to a node or access point or gateway of a wireless LAN, and/or may be another kind of wireless node, running any radio protocol suitable for an industrial milieu, such as any standard issued by the Bluetooth Special Interest Group (SIG), any variation of IEEE-802.11, WiFi, Ultra Wide Band (UWB), ZigBee or IEEE-802.15.4, IEEE-802.13 or equivalent, or similar. A radio technology working in the ISM band such as in a protocol from ABB called Wireless interface for sensors and actuators (Wisa) may be used.

The methods of assigning and re-assigning roles in wireless networks as described above, in reference to FIGS. 1-3 and elsewhere in this specification may be carried out by a computer application comprising computer program elements or software code which, when loaded in a processor or computer, causes the computer or processor to carry out the method steps. The functions of processing a determination of a bad condition and re-assigning a role from one node to another may be carried out by processing digital functions, algorithms and/or computer programs and/or by analogue components or analogue circuits or by a combination of both digital and analogue functions. The functions may be carried out by standard processors or micro processors or microcontroller or by hardware or configurable hardware such as a Field-Programmable Gate Array (FPGA), Complex Programmable Logic Device (CPLD) or an Application Specific Integrated Circuit (ASIC). Each processor may have a memory storage unit, or may be connected to a memory storage unit of another unit such as a process system control unit or a PLC (programmable Logic Controller) or other system part thereof.

The computer program comprises computer program code elements or software code portions that make the computer perform the method of assigning and re-assigning roles to nodes using algorithms and/or equations, data, stored values, predetermined values and calculations previously described. A part of the program may be stored in a processor as above, but also in a ROM, RAM, PROM, EPROM or EEPROM chip or similar memory means. The program in part or in whole may also be stored on, or in, other suitable computer readable medium such as a magnetic disk, such as a CD (compact disc) or a DVD (digital versatile disc), hard disk, magneto-optical memory storage means, in volatile memory, in flash memory, as firmware, stored on a data server or on one or more arrays of data servers. Other known and suitable media, including removable memory media such as a USB memory stick and other removable flash memories, hard drives etc. may also be used.

It should be noted that while the above describes exemplifying embodiments of the invention, there are several variations and modifications to the methods here described of re-assigning roles, and in particular to ways of determining when a role shall be re-assigned which may be made to the disclosed solution without departing from the scope of the present invention as defined in the appended claims.

What is claimed is:

1. A method for maintaining network lifetime of a wireless sensor network of an industrial control or monitoring system, said wireless sensor network comprising a plurality of wireless sensor nodes wherein selected wireless sensor nodes have assigned roles in said wireless sensor network,
   characterised by determining a below threshold operating condition of a first wireless sensor node assigned to a role and re-assigning the role to a second wireless sensor node in said network,
   wherein the determining the below threshold operating condition comprises the first wireless sensor node determining the below threshold operating condition and the first wireless sensor node requesting the re-assignment with a release request to a network coordinator of said wireless sensor network, said network coordinator is a central node that receives said release request from said first wireless sensor node over said wireless sensor network, and said network coordinator in communication with said second wireless sensor node over said wireless sensor network,
   characterised by the network coordinator sending a role re-assign command to the second wireless sensor node and sending a role release confirmation to the first wireless sensor node.

2. The method according to claim 1, characterised by determining that the second wireless sensor node is a candidate, that does not have a below threshold operating condition, from a list of candidate nodes.

3. The method according to claim 2, characterised by reassigning the role to the second wireless sensor node and deleting the first wireless sensor node from at least one candidate list held by the second sensor wireless node.

4. The method according to claim 2, characterised by determining that the second wireless sensor node does not have a below threshold operating condition and by the second wireless sensor node accepting the role.

5. The method according to claim 2, characterised by determining that the second wireless sensor node has a below threshold operating condition and by the first wireless sensor node passing the role to another candidate on the list.

6. The method according to claim 2, characterised by determining that the second sensor node has a below threshold operating condition and by removing the second wireless sensor node from the candidate list.

7. The method according to claim 6, characterised by the network coordinator searching the list of candidate sensor nodes to find a wireless sensor node that does not have a below threshold operating, or a wireless node having better operating conditions, according to at least one predetermined criteria.

8. The method according to claim 7, characterised by the network coordinator, on finding a candidate wireless sensor node that does not have a below threshold operating condition according to one or more optimisation criteria, by sending a role re-assign command to the second wireless candidate sensor node and sending a role release command to the first wireless sensor node.

9. The method according to claim 1, characterised in that the list of candidate nodes is maintained as a list or file in a memory storage unit of a network node.

10. A wireless sensor node arranged for wireless communication in a wireless sensor network of an industrial control or monitoring system arranged for maintaining network lifetime of the wireless sensor network comprising a plurality of wireless sensor nodes, the wireless sensor node being able to be assigned a role,
characterised in that the wireless sensor node is arranged to determine a below threshold operating condition of the wireless sensor node, and to request a network coordinator to re-assign the role to another wireless sensor node defining a wireless sensor node in the wireless sensor network, said network coordinator a central node that receives a release request from said wireless sensor node over said wireless sensor network, and said network coordinator in communication with said another wireless sensor node over said wireless sensor network,
characterised by the network coordinator sending a role re-assign command to the another wireless sensor node and sending a role release confirmation to the wireless sensor node.

11. The wireless sensor node according to claim 10, characterised in that the wireless sensor node is configured to be compatible with any standard or protocol from the group of: WIRELESSHART™, ISA100™, BLUETOOTH™, ZIGBEE™.

12. The wireless sensor node according to claim 10, characterised in that the wireless sensor node is arranged to be powered at least in part by an energy storage unit comprising any from the group of: battery, accumulator, capacitor, condenser, kinetic motion or vibration to electric energy transducer, temperature difference thermal-magnetic electric conversion generator, solar cell, bio battery with bacteria, wind or water movement generator.

13. The device according to claim 10, characterised in that the wireless sensor node is equipped with at least one transducer for sensing or measuring a condition of any from the group of: an equipment, a process, an environmental condition in the vicinity of an equipment or a process.

14. A method for using a wireless sensor node for communicating data between wireless sensor nodes connected in a wireless sensor network of an industrial control system or a process control system, the wireless sensor node being able to be assigned a role,
the method comprising the steps of:
determining a below threshold operating condition of the wireless sensor node, and
requesting a network coordinator to re-assign the role to another wireless sensor node defining a wireless sensor node in the wireless sensor network, said network coordinator a central node that receives a release request from said wireless sensor node over said wireless sensor network and said network coordinator in communication with said another wireless sensor node over said wireless sensor network,
characterised by the network coordinator sending a role re-assign command to the another wireless sensor node and sending a role release confirmation to the wireless sensor node.

15. A computer program comprising software code portions or computer code executing on a computer or processor to carry out the steps of a method for maintaining network lifetime of a wireless sensor network of an industrial control or monitoring system, said wireless sensor network comprising a plurality of wireless sensor nodes wherein selected wireless sensor nodes have assigned roles in said wireless sensor network,
characterised by determining a below threshold operating condition of a first wireless sensor node assigned to a role and re-assigning the role to a second wireless sensor node in said network,
wherein the determining the below threshold operating condition comprises the first wireless sensor node determining the below threshold operating condition and the first wireless sensor node requesting the re-assignment with a release request to a network coordinator of said wireless sensor network, said network coordinator a central node that receives said release request from said first wireless sensor node over said wireless sensor network and said network coordinator in communication with said second wireless sensor node over said wireless sensor network,
characterised by the network coordinator sending a role re-assign command to the second wireless sensor node and sending a role release confirmation to the first wireless sensor node.

16. A computer program product with software code portions or computer code stored on a non-transitory computer usable medium, comprising computer readable program means for causing a computer to carry out the steps of a method for maintaining network lifetime of a wireless sensor network of an industrial control or monitoring system, said wireless sensor network comprising a plurality of wireless sensor nodes wherein selected wireless sensor nodes have assigned roles in said wireless sensor network,
characterised by determining a below threshold operating condition of a first wireless sensor node assigned to a role and re-assigning the role to a second wireless sensor node in said network,
wherein the determining the below threshold operating condition comprises the first wireless sensor node determining the below threshold operating condition and the first wireless sensor node requesting the re-assignment with a release request to a network coordinator of said wireless sensor network, said network coordinator a central node that receives said release request from said first wireless sensor node over said wireless sensor network, and said network coordinator in communication with said second wireless sensor node over said wireless sensor network,
characterised by the network coordinator sending a role re-assign command to the second wireless sensor node and sending a role release confirmation to the first wireless sensor node.

17. A wireless sensor network system of an industrial control system comprising a plurality of wireless sensor nodes as claimed in claim 10.

18. The system according to claim 17, characterised in that at least one wireless sensor node at any one time has been assigned a role of a network coordinator and maintains a candidate list over all wireless devices that do not have a below threshold operating condition, from a list of candidate wireless devices and carries out functions of a gateway.

19. The system according to claim 17, characterised in that a plurality of wireless sensor nodes each maintains its own candidate list over wireless devices that do not have a below threshold operating condition.

20. The method according to claim 1, characterised in that a plurality of nodes request re-assignment at the same time.

21. The method according to claim 1, characterised in that the operating condition comprises one of: bandwidth, bit error rate, self test, node validation, available memory, software revision, EMI noise, connectivity.

* * * * *